United States Patent
Jackson et al.

(10) Patent No.: US 11,684,076 B2
(45) Date of Patent: Jun. 27, 2023

(54) FOOD THAWING CABINET AND RELATED METHODS

(71) Applicant: ILLINOIS TOOL WORKS INC., Glenview, IL (US)

(72) Inventors: Steven T. Jackson, Fort Worth, TX (US); Henry L. Nguyen, Haltom City, TX (US); Joseph F. Sanders, North Richland Hills, TX (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 260 days.

(21) Appl. No.: 17/120,421

(22) Filed: Dec. 14, 2020

(65) Prior Publication Data
US 2021/0186066 A1    Jun. 24, 2021

Related U.S. Application Data

(60) Provisional application No. 62/951,621, filed on Dec. 20, 2019.

(51) Int. Cl.
*A23L 3/365* (2006.01)
*A23L 3/00* (2006.01)
(Continued)

(52) U.S. Cl.
CPC ............... *A23L 3/365* (2013.01); *A23L 3/001* (2013.01); *A23L 3/363* (2013.01); *F25D 23/12* (2013.01); *A23V 2002/00* (2013.01)

(58) Field of Classification Search
CPC .......... A23L 3/365; A23L 3/001; A23L 3/363; F25D 23/12; A23V 2002/00; A47J 39/006; A47J 39/003
See application file for complete search history.

(56) References Cited

U.S. PATENT DOCUMENTS 3,548,153 A * 12/1970 Kells ...................... F24C 7/087
                                                    219/400
3,608,627 A *  9/1971 Shevlin ................ A47J 39/006
                                                    165/206
(Continued)

FOREIGN PATENT DOCUMENTS

CN        107846942 A  *  3/2018  ............... A23B 4/07
DE        60209743 T2  * 11/2006  ............. A47F 3/001
(Continued)

OTHER PUBLICATIONS

PCT, International Search Report and Written Opinion, International Application No. PCT/US2020/064819; dated Mar. 19, 2021, 11 pages.

*Primary Examiner* — Emmanuel E Duke
(74) *Attorney, Agent, or Firm* — Thompson Hine LLP (57) ABSTRACT

A food thawing apparatus includes a cabinet structure defining a thawing chamber, and at least one air mover and associated air flow structure for causing an air flow through the thawing chamber. At least one air heating element is positioned for heating the air flow. At least one shelf is positioned within the thawing chamber for supporting a food product in the thawing chamber, the shelf including at least one integrated shelf heating element. A control system is configured for controlling the air mover, the air heating element and the shelf heating element so as to thaw the food product.

20 Claims, 7 Drawing Sheets

(51) Int. Cl.
*A23L 3/36* (2006.01)
*F25D 23/12* (2006.01)

(56) References Cited

U.S. PATENT DOCUMENTS

| | | | |
|---|---|---|---|
| 3,654,853 | A | 4/1972 | Fayling |
| 3,697,728 | A | 10/1972 | Stirzenbecher |
| 3,721,803 | A | 3/1973 | Di Stefano |
| 3,908,749 | A | 9/1975 | Williams |
| 3,965,969 | A | 6/1976 | Williamson |
| 3,982,584 | A | 9/1976 | Spanoudis |
| 4,019,022 | A | 4/1977 | Seider |
| 4,068,115 | A | 1/1978 | Mack et al. |
| 4,806,736 | A | 2/1989 | Schirico |
| 4,816,646 | A | 3/1989 | Solomon |
| 4,922,626 | A | 5/1990 | Fiddler |
| 5,111,577 | A | 5/1992 | Sheridan |
| 5,182,438 | A * | 1/1993 | Oakes .............. A47J 39/006 219/521 |
| 5,408,068 | A | 4/1995 | Ng |
| 5,408,071 | A | 4/1995 | Ragland |
| 5,436,429 | A | 7/1995 | Cline |
| 5,633,064 | A | 5/1997 | Ragland |
| 5,724,886 | A | 3/1998 | Ewald |
| 5,767,024 | A | 6/1998 | Anderson |
| 5,800,905 | A | 9/1998 | Sheridan |
| 5,845,562 | A | 12/1998 | Deni |
| 5,880,435 | A | 3/1999 | Bostic |
| 5,892,202 | A | 4/1999 | Baldwin |
| 5,939,212 | A | 8/1999 | Ragland |
| 5,958,603 | A | 9/1999 | Ragland |
| 6,018,143 | A | 1/2000 | Check |
| 6,222,160 | B1 | 4/2001 | Remke |
| 7,034,254 | B2 | 4/2006 | Grabowski |
| 7,119,306 | B2 | 10/2006 | Boryca |
| 7,316,313 | B1 | 1/2008 | Juchau |
| 7,622,695 | B2 | 11/2009 | DiPucchio |
| 8,258,439 | B2 | 9/2012 | Mak |
| 8,258,443 | B2 | 9/2012 | Caterina |
| 8,633,425 | B2 | 1/2014 | Naylor |
| 8,878,103 | B2 | 11/2014 | Naylor |
| 8,952,296 | B2 | 2/2015 | Hermann |
| 8,952,301 | B2 | 2/2015 | Naylor |
| 2002/0066723 | A1 | 6/2002 | Kasai |
| 2003/0064812 | A1 | 4/2003 | Rappaport |
| 2004/0139863 | A1* | 7/2004 | Boryca .............. A23L 3/365 99/483 |
| 2007/0000918 | A1 | 1/2007 | Steinhauser |
| 2007/0151707 | A1* | 7/2007 | Lyons .............. H05K 7/20145 165/104.21 |
| 2010/0140251 | A1 | 6/2010 | Shei |
| 2011/0114624 | A1* | 5/2011 | Chung .............. A47J 39/006 219/385 |
| 2011/0283895 | A1* | 11/2011 | Veltrop .............. A23L 5/15 392/416 |
| 2011/0297665 | A1 | 12/2011 | Parker |
| 2014/0083308 | A1 | 3/2014 | Galjaard |
| 2016/0095468 | A1 | 4/2016 | Storiz |
| 2016/0102911 | A1* | 4/2016 | Parker .............. F26B 5/044 34/239 |

FOREIGN PATENT DOCUMENTS

| | | | |
|---|---|---|---|
| GB | 1273217 | 5/1972 | |
| JP | H0523156 A * | 2/1993 | |
| JP | 2004211989 A * | 7/2004 | |
| JP | 2006174730 A | 7/2006 | |
| KR | 20020057831 A * | 7/2002 | ............ A47J 39/006 |
| WO | WO 99/58036 A2 | 11/1999 | |
| WO | WO-0018281 A1 * | 4/2000 | ............ A47J 39/006 |

* cited by examiner

Fig. 10

FOOD THAWING CABINET AND RELATED METHODS

TECHNICAL FIELD

The present application relates generally to cabinets utilized for thawing frozen foods, and more particularly to a food thawing cabinet for rapidly thawing frozen foods in a controlled manner.

BACKGROUND

It is known to provide thawing cabinets for thawing frozen food products in commercial environments such as restaurants and cafeterias. Achieving high speed thawing is an important consideration. U.S. Pat. No. 7,119,306 describes one such food thawing cabinet and utilizes a cabinet structure having a central mullion that divides the cabinet into two thawing chambers. The mullion contains a plurality of blowers for moving air at high volume, and a heating element for heating the moving air. The heating element and blowers are controlled in accordance with an advanced temperature-based control logic to achieve high speed thawing of large food volumes. Similar cabinets including only one thawing chamber exist.

It would be desirable to improve upon the thawing time achievable in food thawing cabinets such as those described above.

SUMMARY

In one aspect, a food thawing apparatus combines convection thawing by air flow with conductive thawing via heated shelves.

In another aspect, a food thawing apparatus includes a cabinet structure defining a thawing chamber, and at least one air mover and associated air flow structure for causing an air flow through the thawing chamber. At least one air heating element is positioned for heating the air flow. At least one shelf is positioned within the thawing chamber for supporting a food product in the thawing chamber, the shelf including at least one integrated shelf heating element. A control system is configured for controlling the air mover, the air heating element and the shelf heating element so as to thaw the food product.

In one implementation of the foregoing aspect, a shelf temperature sensor provides an output indicative of a shelf temperature of the shelf, and the control system is configured to control the shelf heating element based at least in part upon the output of the shelf temperature sensor, wherein the control system is configured to control the shelf heating element to maintain the shelf temperature at a shelf temperature set point, wherein the control system is configured to switch the shelf temperature set point between at least a first temperature set point and a second temperature set point. In one example of such implementation, the first temperature set point is below the second temperature set point, wherein the control system is configured to monitor a run time of the shelf heating element and to switch the shelf temperature set point from the first temperature set point to the second temperature set point when the run time exceeds a set run time threshold.

In one implementation of the foregoing aspect, the control system is configured to identify a thawed condition of the food product based upon monitoring of a shelf heater run time. In on example of such implementation, a visual output indicator is provides, and the control system is configured to trigger the visual output indicator to alert an operator to the thawed condition of the food product.

In a further aspect, a food thawing apparatus includes a cabinet structure defining a thawing chamber, and at least one shelf is positioned within the thawing chamber for supporting a food product in the thawing chamber, the shelf including at least one integrated shelf heating element. A shelf temperature sensor provides an output indicative of a temperature of the shelf. A control system is configured for controlling the shelf heating element so as to thaw the food product by controlling the shelf heating element based at least in part upon the output of the shelf temperature so as to maintain the temperature of the shelf at a shelf temperature set point.

In another aspect, a food thawing apparatus includes a cabinet structure defining a thawing chamber, and at least one air mover and associated air flow structure for causing an air flow through the thawing chamber. At least one shelf is positioned within the thawing chamber for supporting a food product in the thawing chamber, the shelf including at least one integrated shelf heating element and a shelf temperature sensor. A control system configured for controlling the shelf heating element so as to thaw the food product by controlling the shelf heating element to maintain a shelf temperature set point, wherein the control system is configured to automatically adjust the shelf set point temperature based upon a monitored condition of the apparatus.

In another aspect, a method of thawing food product in a thawing chamber involves using at least one shelf positioned within the thawing chamber for supporting a food product in the thawing chamber, the shelf including at least one integrated shelf heating element; and controlling the shelf heating element so as to thaw the food product by controlling the shelf heating element based at least in part upon the output of a shelf temperature so as to maintain the temperature of the shelf at a shelf temperature set point. In one implementation of this aspect, the shelf temperature set point is switched between at least a first temperature set point and a second temperature set point, where the first temperature set point is below the second temperature set point, the switching of the shelf temperature set point from the first temperature set point to the second temperature set point is based upon a monitored condition indicative of a frozen food load being placed upon the shelf.

The details of one or more embodiments are set forth in the accompanying drawings and the description below. Other features, objects, and advantages will be apparent from the description and drawings, and from the claims.

DETAILED DESCRIPTION

Figure 1:
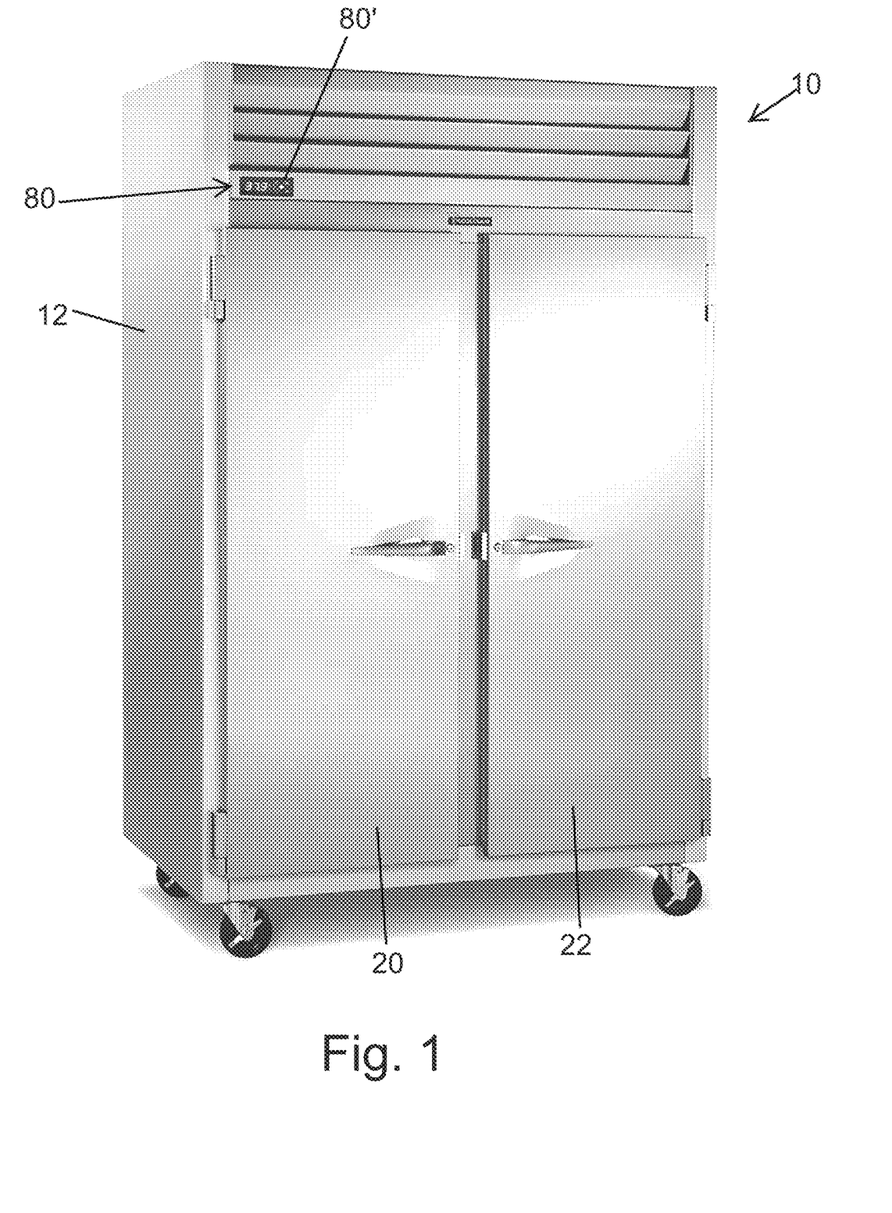
FIG. 1 is perspective view of a thawing apparatus.
Figure 2:
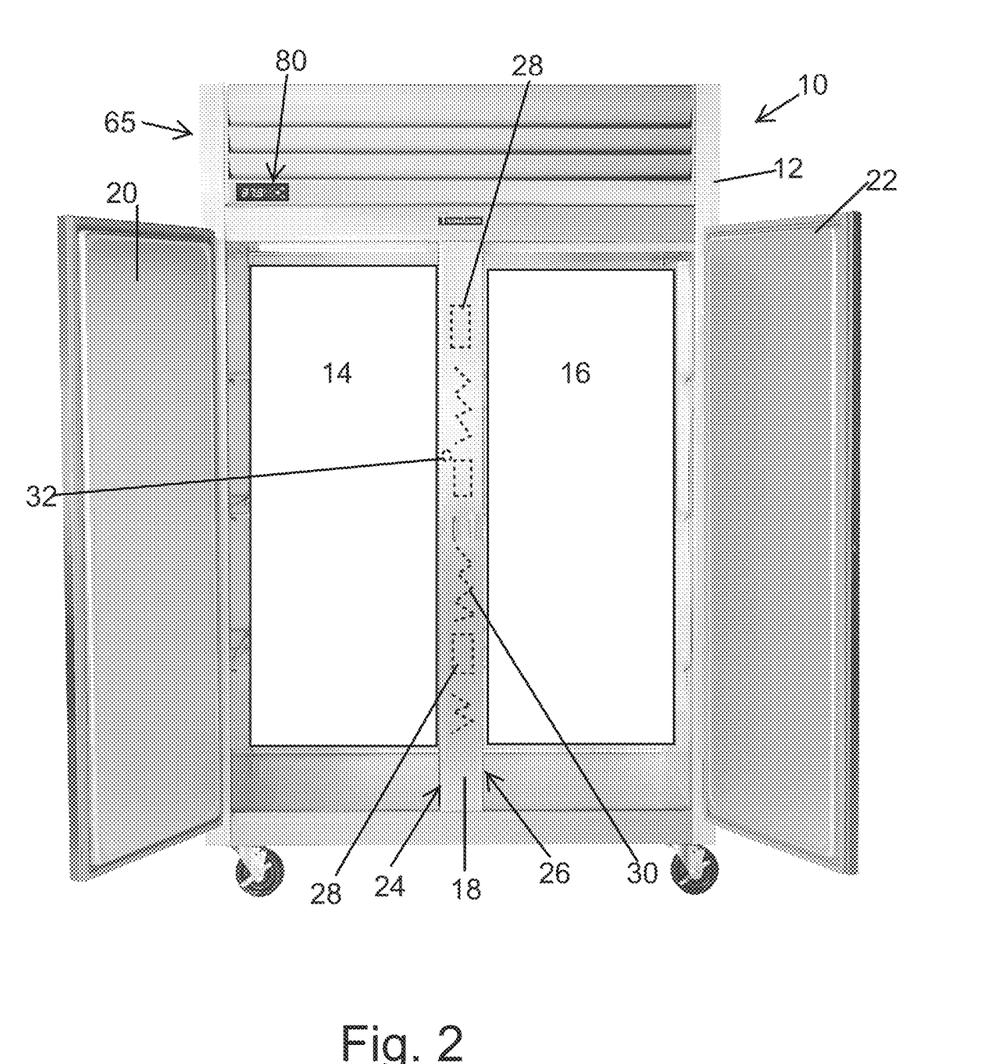
FIG. 2 is a perspective view of the apparatus with doors opened.
Figure 3:
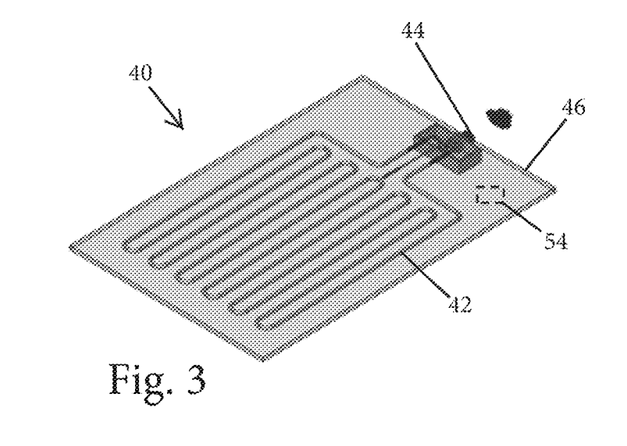
FIGS. 3-6 show a heated shelf system of the apparatus.
Figure 4:
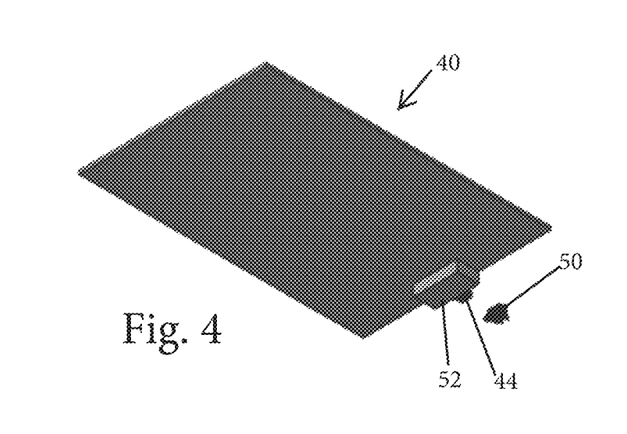
Figure 5:
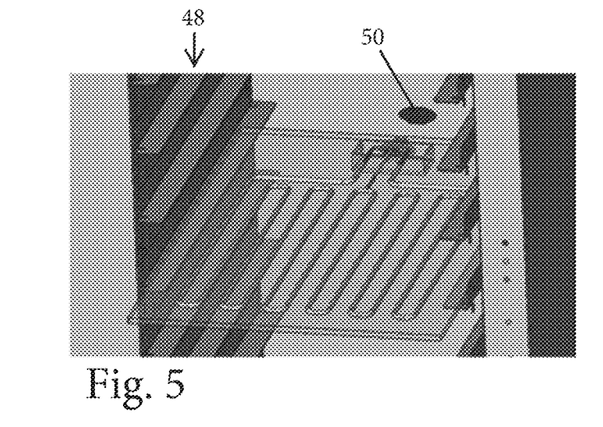
Figure 6:
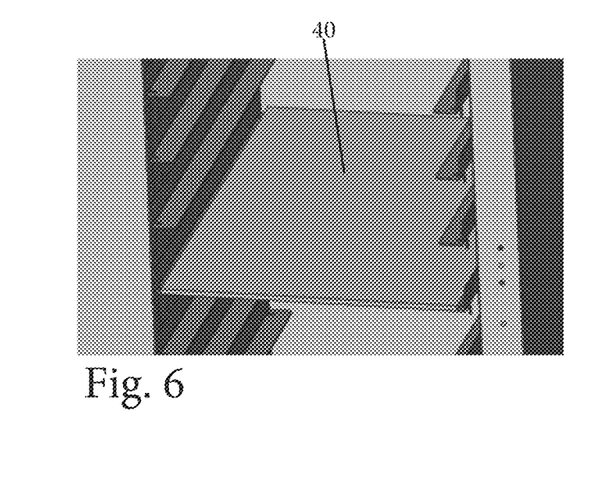
Figure 7:
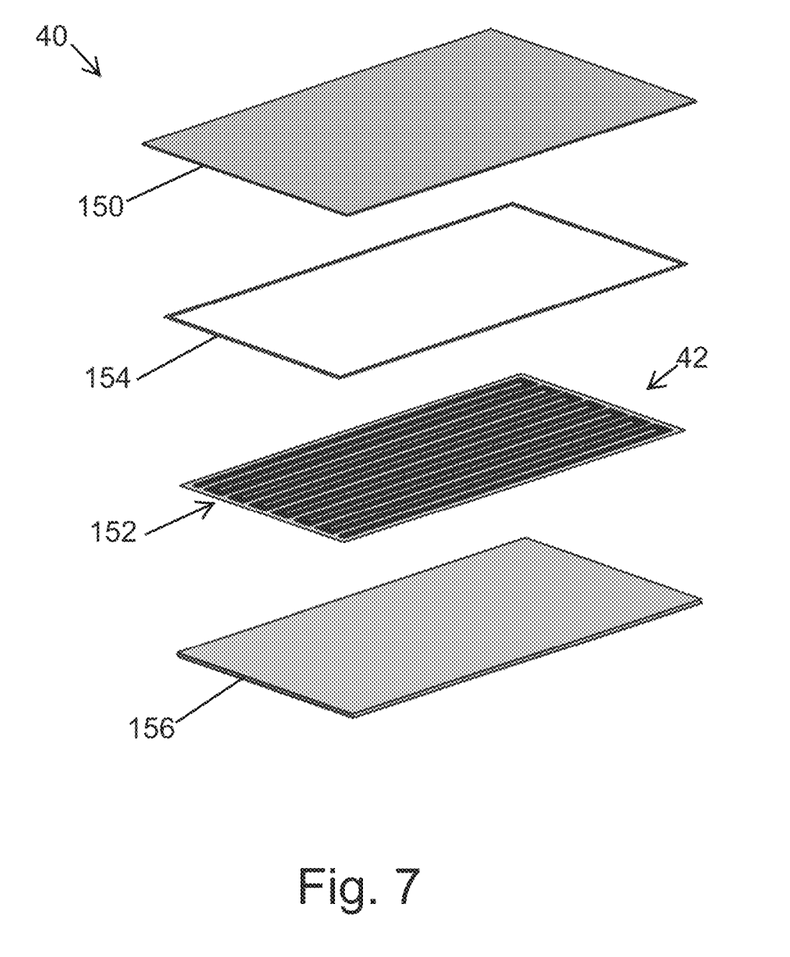
FIG. 7 shows a partial, exploded view of one exemplary shelf structure.

Referring to FIGS. 1-2, one exemplary thawing apparatus 10 includes a cabinet structure 12 including a thawing chamber 14 and a thawing chamber 16, with a mullion/ center wall 18 separating the chambers. Two doors 20 and 22 are provided on respective sides of the mullion 18 for providing access to the chambers 14 and 16. The mullion 18 includes opposite sides 24 and 26 respectively facing the thawing chambers 14 and 16. Each side has multiple openings, including a set of air intake openings for passing air from the thawing chambers into an interior of the mullion 18 and a set of air outlet openings for passing air from the interior of the mullion 18 to the chambers. One or more air movers 28 is/are located within the mullion 18 for causing air flow into and out of the interior of the mullion when operated. One or more heating elements 30 is/are also located internal the mullion for heating air prior to passing it from the interior of the mullion into either of the thawing chambers 14 and 16. A temperature sensor 32 may be provided in association with the mullion 18 for sensing a temperature of air delivered from the interior of the mullion 18 to the thawing chambers 14 and 16. As described in U.S. Pat. No. 7,119,306, such a cabinet can be effectively controlled for food thawing.

As seen in FIGS. 3-7, in order to improve the thawing time of the cabinet, the cabinet also includes shelves 40 with integrated heating elements 42. By way of example, each shelf 40 may be formed of a thermally conductive metal plate 150 (e.g., aluminum or stainless steel) with applied heating elements 42 in the form of a film heater 152 with resistive heating elements, such as may be applied using a pressure-sensitive adhesive 154 (e.g. film heaters applied to the bottom of the shelves). The bottoms of the shelves may also be insulated by, for example, an HDPE layer 156, to assure heat delivery to the upper surface of each shelf, where food product sits during thawing. Other types of shelf heating elements are also possible, such as heating elements embedded in the shelf material or mechanically clamped to the shelf plate 150, both of which are also considered integrated with the shelf.

Here, each shelf 40 includes an electrical connector 44 at its rear end 46, which can slidingly and matingly engage with an electrical connector 50 located at the rear side of one of the thawing chambers. The electrical connection provides at least power to the shelf and, in some embodiments, may provide connections for control. Where the thawing chamber includes a plurality of sets of slide rails 48 for supporting shelves 40, each slide rail set may include one of the electrical connectors 50 positioned to be engaged by a shelf electrical connector when the shelf is inserted into the chamber along the slide rails. Here, the electrical connectors 44 are positioned on a mount box 52 located at the underside of each shelf. In this way, the connection between the two connectors 44 and 50 is covered by the shelf when the shelf is fully inserted into the thawing chamber. In an alternative embodiment, each shelf may be fixed in position within the thawing chamber (e.g., using one or more fasteners) and may be replaceable (e.g., by removing the fasteners). In such an embodiment, the electrical connectors may not readily engage each other via shelf sliding or may not be present at all.

Each shelf 40 also includes one or more temperature sensors 54 for providing an indication of shelf temperature, such as an upper shelf surface temperature, for control purposes.

The cabinet 10 also includes a top-mounted refrigeration system 65, including a compressor, a condenser coil, and an evaporator with associated air mover. The refrigeration system air mover may, for example, be a squirrel cage blower or an axial fan. The evaporator section of the system is in flow communication with one or both of the thawing chambers via inlet openings in the top wall of the chamber(s) beneath the evaporator and outlet/return openings. An evaporator coil temperature sensor 62 (FIG. 8) may also be provided as part of the refrigeration system.

Figure 8:
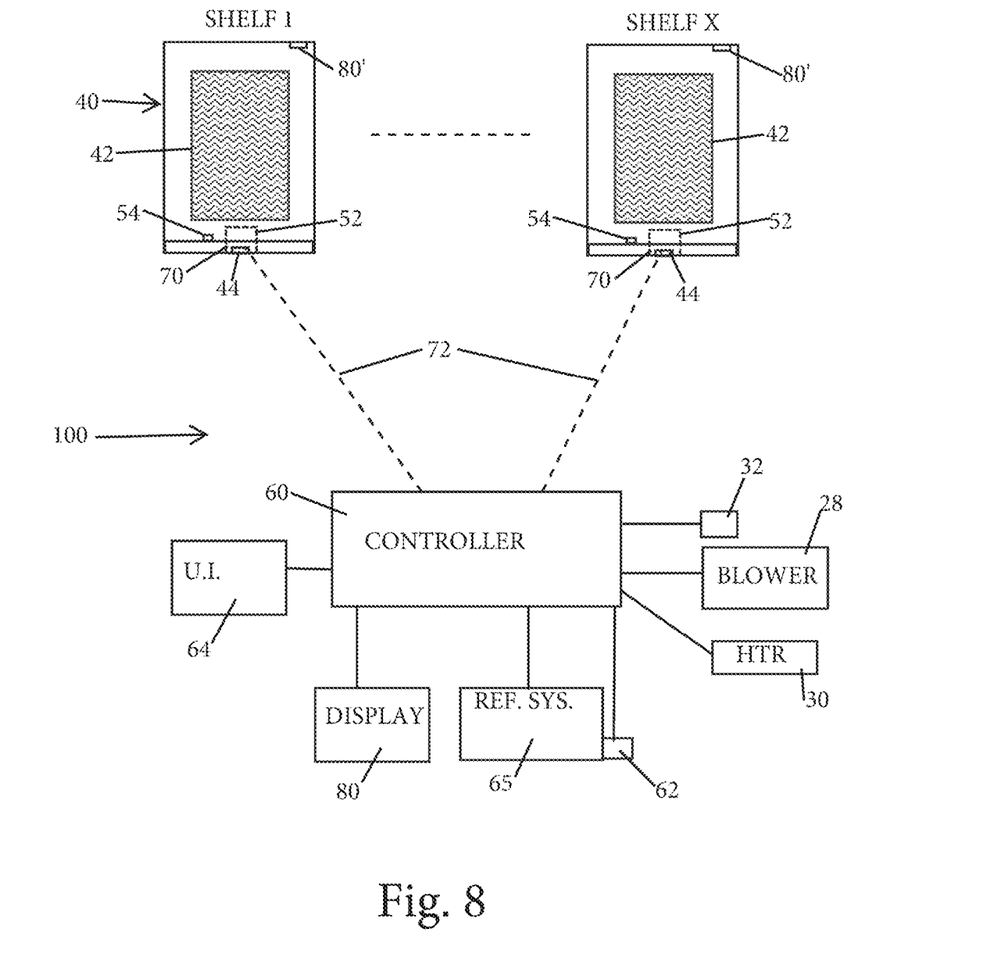
FIG. 8 shows a control system.

An exemplary control system 100 is shown in FIG. 8, in which a controller 60 is connected to receive inputs from both temperature sensors 32 and 62 and is also connected to control the operation of the mullion blowers 28, the heating element(s) 30 and the refrigeration system 65, including its blower. The controller 60 may receive input from any suitable user input device or devices 64, such as switches, input keys or input knobs. The controller 60 may also be configured to effect display of information to an operator via one or more displays 80. The control system 100 is also configured to control shelf heating. In the illustrated embodiment of the control system 100, each shelf 40 also incorporates a controller 70 (e.g., a microcontroller) that operates independently to control its on-board heating element (e.g., without input from the controller). However, each shelf controller 70 may have a connection 72 to the controller 60 (though such a connection is not required).

In an alternative embodiment, the on-shelf controllers 70 could be eliminated, with the controller 60 handling all control functions for the shelf heating elements.

As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the device or the control functions of any component thereof. As suggested above, a control system may have one or more controllers.

Regardless of the control system set-up, the control system 100 is configured to carry out thawing operations by controlling the air heating element based upon the air temperature sensor and by controlling the shelf heating element based upon the shelf temperature sensor. For example, the control system 100 is configured to control the air heating element(s) 30 to maintain an air temperature set point, and the control system 100 is configured to control the shelf heating element(s) 42 to maintain each shelf at a shelf temperature set point.

In one implementation, the shelf temperature set point (e.g., about 41° F.) is higher than the air temperature set point (e.g., about 39° F.).

In another implementation, the control system 100 is configured to have a more dynamic control of the shelf heating elements 42 in which the control system is configured to implement two different shelf temperature set points and each shelf is assigned an active temperature set point based upon a monitored condition. For example, the control system 100 may be configured to switch the shelf temperature set point for each shelf between at least a first temperature set point and a second temperature set point, where the first temperature set point (e.g., 35-37° F.) is below the air temperature set point (e.g., 39° F.) and the second temperature set point (e.g., 44-46° F.) is above the air temperature set point. In one implementation, the control system 100 is configured to monitor a run time of the shelf heating element 42 of each shelf 40 and to switch the shelf temperature set point from the first temperature set point to the second temperature set point when the run time exceeds a set run time threshold.

Figure 9:
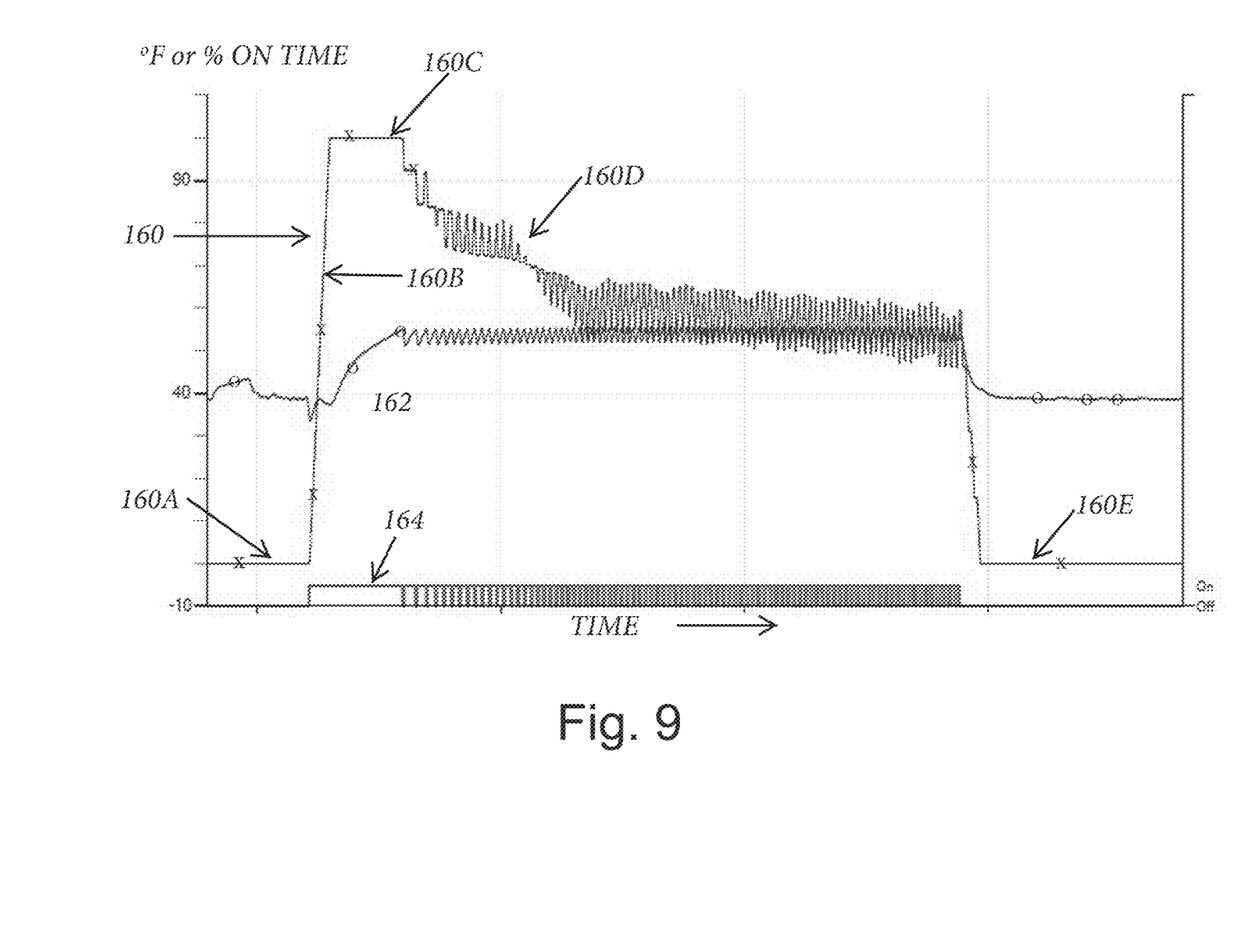
FIG. 9 is an exemplary graph of shelf heater run time over the course of product thawing.

Referring to the exemplary graph of FIG. 9, line 160 indicates a shelf heating element run time percentage over some set rolling time duration, such as five minutes. Line 162 represents the air temperature in the cabinet. Line 164 represents a shelf heating element on/off command that is triggered based upon comparison of the actual shelf temperature to the shelf temperature set point, with high being on and low being off. When no frozen food product is on a given shelf, the air flow past the shelf will typically be sufficient to maintain the shelf temperature above the first temperature set point, and the shelf heating element 42 will not need to run at all, as represented by region 160A. Placement of a frozen food product on a shelf establishes a thermal gradient that rapidly brings the shelf temperature down below the first temperature set point. In order to maintain the shelf surface temperature at the first temperature set point (e.g., 35-37° F.), the control system will cause the shelf heating element 42 to run, and the shelf heating element run time percentage will rapidly rise to 100%, per regions 160B and 160C. This increase in the run time percentage of the shelf heating element can be detected and use to switch the shelf temperature set point to the second temperature set point, which is above the air temperature set point. As the temperature of the food product increases over time, operation of the heating element is needed less and less as indicated by region 160D. In one implementation, after the shelf temperature set point has been at the second temperature set point for a set time duration (e.g., 12-16 hours), the shelf temperature set point is switched back to the first temperature set point, and the shelf heating element will no longer need to operate, as indicated by region 160E.

In terms of monitoring the heating element run time to determine when to switch from the first temperature set point to the second temperature set point it is not necessary for the control system 100 to evaluate an on-time duration or to even directly calculate a rolling run time percentage. Instead, the on-shelf controller 70 of each shelf could simply periodically (e.g., every ten seconds) check whether the heating element 42 of the shelf is running, and load a run status indicator bit into a FIFO register array (e.g., load a one bit if the heating element is running and load a zero bit if the heating element is not running). The sum of the bits in the FIFO register array then provides an indication of the run time percentage over a period of time (e.g., in the case of thirty bit register array that is loaded every ten seconds, a sum of 30 indicates that the shelf heating element has been on 100% of the time for the last five minutes, and a sum of 15 indicates that the shelf heating element has been on 50% of the time for the last five minutes). Similarly, the control of the shelf heating element 42 based upon the output of the shelf temperature sensor 54 could be implemented using a FIFO register array that is indicative of shelf temperature. Thus, the shelf temperature sensor output can be A/D converted into a digital value that is loaded into the array and the sum of a set of periodically taken values can be evaluated for shelf heating element control (e.g., for an array of five values, the total sum of the values is evaluated against a sum value threshold that represents the shelf temperature set point). This type of operation enables a relatively simple and inexpensive microcontroller to be used as the on-shelf controller 70. However, use of more complex controllers capable of directly calculating a run time percentage is also possible.

In an alternative embodiment, rather than switching the shelf temperature set point from the second temperature set point back to the first temperature set point after a set time duration, the control system 100 may be configured to monitor the shelf heating element run time in order to identify when the food product associated with the shelf is sufficiently thawed. For example, when the heating element run time percentage falls below a set level (e.g., 50%, or a register sum of 15 using the FIFO register example above), the control system 100 may switch the shelf temperature set point back to the first temperature set point.

The thawing cabinet may include one or more visual output indicators 80' (e.g., one for each shelf) and the control system 100 may be configured to trigger the visual output indicator(s) to alert an operator to the thawed condition of the food product. This can be achieved on shelf by shelf basis. The visual output indicator may, for example, be located on an external surface of the cabinet structure, or located internal of the thawing chamber, or integrated into the shelf per 80' in FIG. 8.

The heat sources 30 and 42 inside the cabinet are in competition with the refrigeration system 60 during thawing. The shelves 40 attempt to conduct heat into the food product. Each shelf is controlled independently and responsive to the load it sees. This allows for "lean" thawing where the user can thaw food product as needed as opposed to a "batch" mode. The refrigeration system is trying to keep the overall cabinet at food-appropriate temperatures (<41° F.).

Some of the heat produced by the shelves is removed via convection, and therefore insulating the bottom surfaces of the shelves may be beneficial.

The combination of heated shelves with the air flow can decrease the thawing time of food products significantly.

Figure 10:
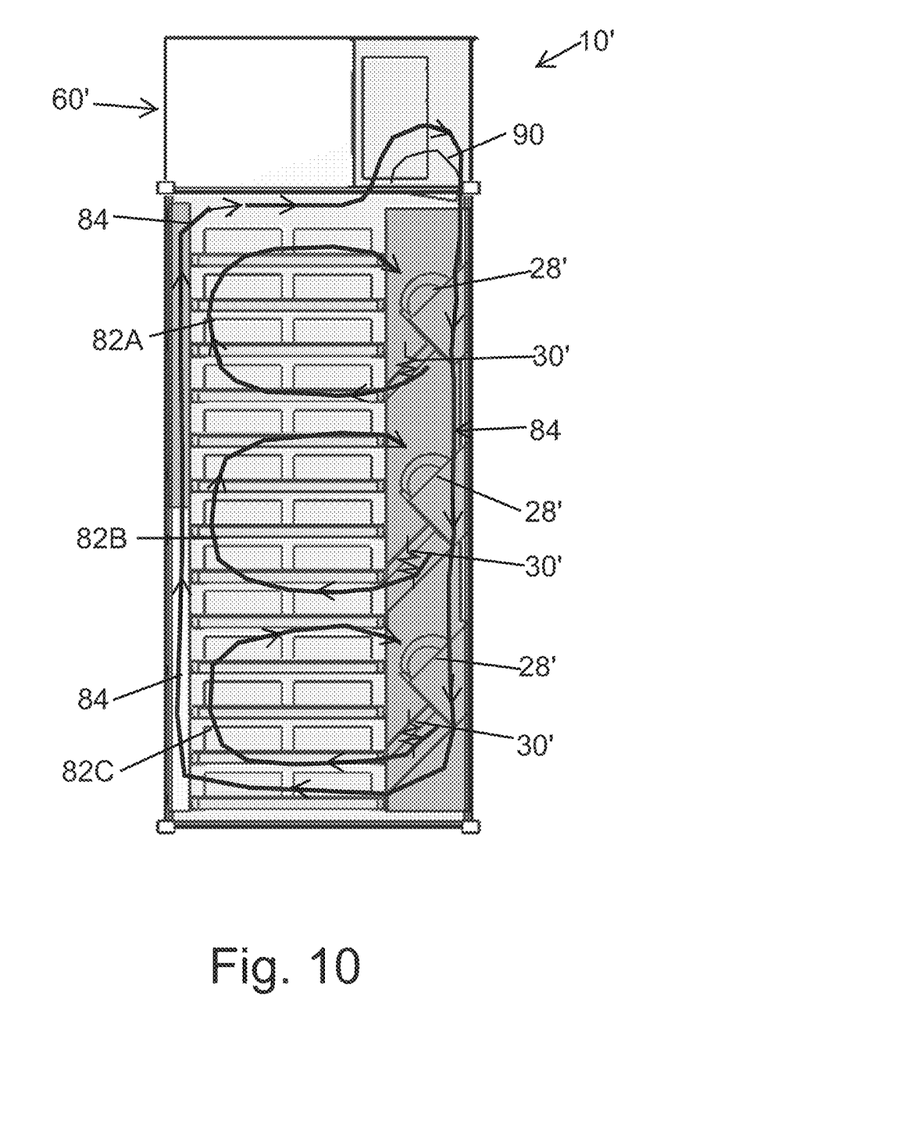
FIG. 10 shows an alternative thawing apparatus configuration.

It is to be clearly understood that the above description is intended by way of illustration and example only, is not intended to be taken by way of limitation, and that other changes and modifications are possible. In more advanced implementations, each shelf could include multiple heaters so that individual shelf regions can be controlled to set point temperatures. Thawing cabinets with a variety of different air flow arrangements are also contemplated. For example, FIG. 10 depicts a thawing apparatus 10' in which the air movers 28', with associated air heating elements 30', are arranged to produce multiple circulating air flow circuits 82A-82C within the thawing chamber over the shelves, and the refrigeration system 60' includes an associated evaporator fan 90 that also creates a primary air flow circuit 84 that envelopes the air flow circuits 82A-82C. Still other variations and modifications are possible.

What is claimed is:

1. A food thawing apparatus, comprising:
   a cabinet structure defining a thawing chamber;
   at least one air mover and associated air flow structure for causing an air flow through the thawing chamber;
   at least one air heating element positioned for heating the air flow;
   at least one shelf positioned within the thawing chamber for supporting a food product in the thawing chamber, the shelf including at least one integrated shelf heating element; and
   a control system configured for controlling the air mover, the air heating element and the shelf heating element so as to maintain air and shelf temperature conditions suitable for thawing the food product.

2. The food thawing apparatus of claim 1, further comprising:
   an air temperature sensor for providing an output indicative of an air temperature in the thawing chamber;
   a shelf temperature sensor for providing an output indicative of a temperature of the shelf;

wherein the control system is configured to control the air heating element based at least in part upon the output of the air temperature sensor;

wherein the control system is configured to control the shelf heating element based at least in part upon the output of the shelf temperature sensor.

3. The food thawing apparatus of claim 2, wherein the control system is configured to control the air heating element to maintain the air temperature at an air temperature set point, wherein the control system is configured to control the shelf heating element to maintain the temperature of the shelf at a shelf temperature set point, wherein the shelf temperature set point is different than the air temperature set point.

4. The food thawing apparatus of claim 3, wherein the control system is configured to switch the shelf temperature set point between at least a first temperature set point and a second temperature set point, wherein the first temperature set point is below the air temperature set point and the second temperature set point is above the air temperature set point.

5. The food thawing apparatus of claim 4, wherein the control system is configured to monitor a run time of the shelf heating element and to switch the shelf temperature set point from the first temperature set point to the second temperature set point when the run time exceeds a set run time threshold.

6. The food thawing apparatus of claim 5, wherein the control system is configured to monitor a duration of time that the shelf temperature set point is the second temperature set point and to switch the shelf temperature set point from the second temperature set point back to the first temperature set point when the duration of time exceeds a set time duration.

7. The food thawing apparatus of claim 4, wherein the second controller is integrated into the shelf.

8. The food thawing apparatus of claim 3, wherein the control system includes a first controller for controlling the air mover and the air heating element and a second controller for controlling the shelf heating element.

9. The food thawing apparatus of claim 1, wherein the shelf is removably positioned within the thawing chamber, wherein the shelf includes a first electrical connector integrated thereon, wherein the cabinet structure includes a second electrical connector that is engaged with the first electrical connector element.

10. The food thawing apparatus of claim 1 wherein a bottom surface of the shelf is insulated.

11. The food thawing apparatus of claim 1, further comprising:
a shelf temperature sensor for providing an output indicative of a shelf temperature of the shelf;
wherein the control system is configured to control the shelf heating element based at least in part upon the output of the shelf temperature sensor, wherein the control system is configured to control the shelf heating element to maintain the shelf temperature at a shelf temperature set point, wherein the control system is configured to switch the shelf temperature set point between at least a first temperature set point and a second temperature set point.

12. The food thawing apparatus of claim 11, wherein the first temperature set point is below the second temperature set point, wherein the control system is configured to monitor a run time of the shelf heating element and to switch the shelf temperature set point from the first temperature set point to the second temperature set point when the run time exceeds a set run time threshold.

13. A food thawing apparatus, comprising:
a cabinet structure defining a thawing chamber;
at least one shelf positioned within the thawing chamber for supporting a food product in the thawing chamber, the shelf including at least one integrated shelf heating element;
a shelf temperature sensor for providing an output indicative of a temperature of the shelf;
a control system configured for controlling the shelf heating element so as to thaw the food product by controlling the shelf heating element based at least in part upon the output of the shelf temperature sensor so as to maintain the temperature of the shelf at a shelf temperature set point;
wherein the control system is configured to switch the shelf temperature set point from a first temperature set point to a second temperature set point based upon a monitored condition indicative of a frozen food load being placed upon the shelf.

14. The food thawing apparatus of claim 13, wherein the first temperature set point is below the second temperature set point.

15. The food thawing apparatus of claim 14, wherein the monitored condition is a heat application indicator of the shelf heating element.

16. The food thawing apparatus of claim 15, wherein the heat application indicator is determined based upon a run time of the shelf heating element.

17. The food thawing apparatus of claim 14, further comprising:
at least one air mover for causing an air flow through the thawing chamber;
at least one air heating element positioned for heating the air flow;
an air temperature sensor for providing an output indicative of an air temperature in the thawing chamber;
wherein the control system is configured to control the air heating element based at least in part upon the output of the air temperature sensor so as to maintain the air temperature at an air temperature set point;
wherein the first temperature set point is below the air temperature set point and the second temperature set point is above the air temperature set point.

18. A food thawing apparatus, comprising:
a cabinet structure defining a thawing chamber;
at least one air mover and associated air flow structure for causing an air flow through the thawing chamber;
at least one shelf positioned within the thawing chamber for supporting a food product in the thawing chamber, the shelf including at least one integrated shelf heating element;
a shelf temperature sensor;
a control system configured for controlling the shelf heating element so as to thaw the food product by controlling the shelf heating element to maintain a shelf temperature set point, wherein the control system is configured to automatically adjust the shelf set point temperature set point based upon a monitored condition of the apparatus.

19. The food thawing apparatus of claim 18, wherein the monitored condition is a run time of the shelf heating element.

20. The food thawing apparatus of claim 18, wherein the control system is configured to maintain the shelf temperature set point from a range below 40° F. to a range above 40° F.

* * * * *